May 22, 1951  R. A. ROBERT  2,554,122
LIVING ACCOMMODATIONS IN AIRPLANE WINGS
Filed Dec. 15, 1945
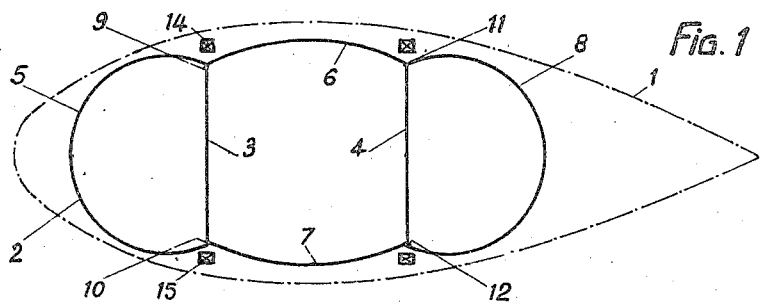
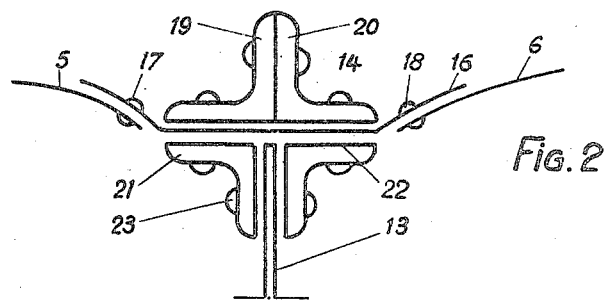
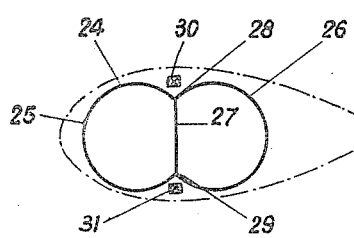
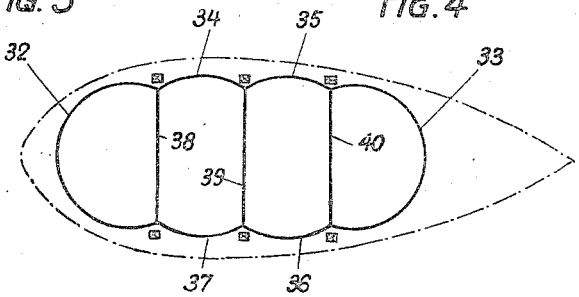
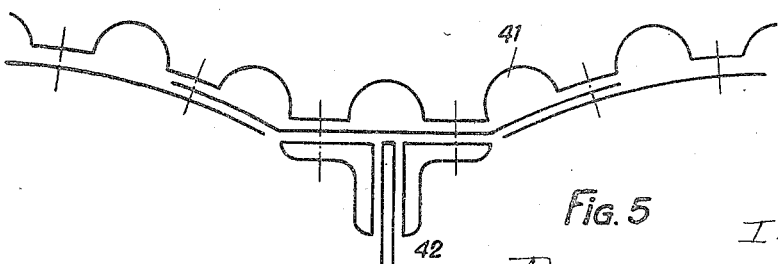
INVENTOR
ROGER AIME ROBERT
By:
Haseltine, Lake & Co.
AGENTS Patented May 22, 1951

2,554,122

UNITED STATES PATENT OFFICE 2,554,122

LIVING ACCOMODATIONS IN AIRPLANE WINGS

Roger Aimé Robert, Boulogne-sur-Seine, France

Application December 15, 1945, Serial No. 635,311
In France January 15, 1944

Section 1, Public Law 690, August 8, 1946
Patent expires January 15, 1964

11 Claims. (Cl. 244—123)

This invention relates to improvements to airplane wings and more specially to improvements to their living accommodations at high altitudes.

The problem of improving the living accommodations of airplanes at high altitude is more and more discussed mainly in the case of transport aircrafts. The problem is more difficult to solve when a large number of passengers are to be isolated from the atmosphere. It has been already suggested to enclose the crew and passengers of the airplane into a pressurized cabin in which the suitable conditions of pressure and temperature may be adjusted. However, it is difficult to construct said pressurized cabins, specially when they must have large dimensions because independently of the air tight condition, it is also necessary to provide for a sturdy construction able to resist the difference in pressure between the inside and the outside, without affecting the flight characteristics of the aircraft.

This invention realizes a simple solution of said problem and permits building airplane wings having a large transport capacity and capable of transporting a large number of passengers in stratospheric or sub-stratospheric flights, under conditions of comfort similar to the conditions afforded at a lower altitude.

This invention is characterized by the fact that using in a manner known per se the inside space of the wing to accommodate the passengers, a pressurized cabin is provided in said wing for the passengers and eventually the crew and that the usual structural parts of the wing frame, the spars for example, are used to withstand the stresses to which the cabin is submitted at high altitude and provide the means to assemble the cabin to the aircraft.

This invention covers particularly an embodiment which may be used for a one or more girder wing and essentially characterized by the fact that the casing is made of circular or almost circular elements mutually assembled at their common assembly points to the girders.

In the case of a girder fitted with top plates, according to the invention the top plates are fitted outside the tight casing, preferably against the casing, in order to use the top plates to assemble the circular members and to take profit of the strength of the girder in the best conditions.

In order that my said invention and the manner in which it is to be carried out may be properly understood, I have illustrated same in the appended drawing in which the same reference letters are used to indicate corresponding parts in all the figures.

Fig. 1 is a schematic cross section of a two-spar wing according to the invention;

Fig. 2 is a schematic view at a larger scale of a cross section made in the vicinity of the joint between two circular members and a spar;

Fig. 3 is a view similar to Fig. 1 of a monospar wing;

Fig. 4 is a view similar to Fig. 3 of a three spar wing; and

Fig. 5 is a modification including corrugated flanges.

Referring to Figs. 1 and 2, according to the invention in the wing 1 of a transport airplane, is provided a pressurized cabin 2 in which may be arranged all the commodities, such as chairs, beds, etc., required for the comfort of the passengers. The wing framework comprises two girders 3 and 4 capable of withstanding the usual stresses due to the weight of the wing and to the aerodynamic forces to which the wing is submitted. According to the invention, these spars are used furthermore to assemble the circular members forming the cabin walls. Said cabin walls comprise a front circular member 5 which, in the example shown, is extended over more than a semi-circle, a ceiling 6, a floor 7 and a rear circular member 8, similar to the front member. The circular members 5—8, the ceiling 6 and the floor 7 are fixed to the spars 3 and 4 and their mutual assembly 9—12 is made in the vicinity of the flanges of said spars. Thus, the latter form an active part of the framework of the cabin and therefore cooperate actively with the walls thereof to withstand the stresses the casing must support, namely the differential pressure existing inside and outside the cabin. Reciprocally, due to their concavity these cabin walls add substantially to the strength of the wing as regards the torsional stresses to which the latter is submitted.

In the embodiment described (see Fig. 2) each spar comprises a web 13, which may be of the solid type or of any suitable lightened type and a pair of flanges 14 and 15. Said flanges are preferably or at least partially located outside the cabin walls. This Fig. 2 shows the details of the assembly of the front circular member 3 to the ceiling 6. These two members are connected by means of an intermediate strip 16 tightly fitted to said members, for example by means of riveted air-tight seams 17 and 18. The strip 16 is squeezed between the top flange 14, formed by two outer angle irons 19 and 20 located outside the cabin 2 and on the other hand, by two inner angle irons 21 and 22 riveted as at 23 to the web 13.

Fig. 3 shows diagrammatically the invention applied to a mono-spar wing. In such case, the pressurized cabin 24 comprises but a front circular member 25 and a rear circular member 26, each extending over more than a semi-circle and assembled to the single spar 27 along their joint edges 28 and 29. The flanges 30 and 31 of the spar 27 are located outside the cabin 24.

Fig. 4 shows schematically the adaptation of the object of the invention to a three spar wing. The pressurized cabin comprises a front circular member 32, a back circular member 33 and two contiguous circular ceilings 34, 35 and two contiguous circular floors 36 and 37. Said walls are assembled together and to the spars 38, 39, 40, to which they are fixed as described before.

In the case of a multi-spar wing, in a modification of the invention, the flanges of each spar are not concentrated along the edges of the web of said spar but are distributed or arranged between the spars, for example, outside the pressurized cabin. In this modification, these flanges are preferably made of corrugated sheets.

Having now particularly described and ascertained the nature of my said invention and in what manner the same is to be performed, I declare that what I claim is:

1. In an airplane wing, a spar transverse to the under and upper wing-surfaces adjacent the low-curvature portions of said respective surfaces, and circumferential walls on the sides of said spars directed toward the leading edge and toward the trailing edge of said wing and sealingly assembled to said spar at the portions thereof adjacent the under and the upper wing surfaces and defining a cabin for passengers.

2. In an airplane wing, a spanwise spar having longitudinal edges adjacent the under and upper wing surfaces, and a pressurized enclosure for passengers comprising a circumferential wall directed spanwise and sealingly assembled with said spar along the edges thereof.

3. In an airplane wing, a spar comprising a transverse web adjacent to and spaced inwardly from the under and upper wing surfaces, circumferential walls, one on each side of said web toward the leading edge and the trailing edge of said wing and sealingly assembled with said spar in portions thereof adjacent to said under and upper wing surfaces, and flanges for said spar, one at each end of said web within said space outside said walls and rigidly connected to said walls.

4. In an airplane wing, a sealed bilobate enclosure directed spanwise adapted to receive passengers therein, and a partition between the two lobes of said enclosure adapted to act as a stressed structure to withstand the main bending stresses in said wing.

5. In an airplane wing, a plurality of walls defining a pressurized enclosure, said walls connecting with each other along spanwise-directed lines, some of said lines being situated adjacent to the under wing surface and others adjacent to the upper wing surface, and partitions bracing said walls between those of said connecting lines adjacent to the under wing surface and those adjacent said upper wing surface, said partitions being adapted to withstand bending stresses applied to said wing.

6. In an aircraft wing: a pressurized cabin directed spanwise of the wing and comprising a front circular lobe and a rear circular lobe connecting through an intersection, a wall interposed between said lobes substantially in the plane of said intersection and adapted to withstand bending stresses exerted on said wing and stresses exerted along said intersection as a result of the pressurization, and means, at the intersection, connecting the wall and the lobes.

7. In an aircraft wing: a pressurized cabin directed spanwise of the wing and comprising a front circular lobe and a rear circular lobe intersecting each other, and a structure substantially in the plane of intersection of said lobes adapted to resist deformation of the cabin under the effect of pressurization strains and also to serve the function of a wing spar, and means, at the intersection, connecting the lobes and structure.

8. Aircraft wing as in claim 7 in which said structure comprises a web placed substantially in the connecting plane of said lobes, and flanges at the ends of said web.

9. Airplane wing as in claim 8, in which said flanges comprise corrugated plates with the corrugations directed spanwise of the wing and applied against said lobes.

10. In an airplane wing, a sealed multilobate enclosure directed spanwise and adapted to receive passengers therein, and a partition between adjacent lobes of said enclosure adapted to act as a stressed structure to withstand the main bending stresses in said wing.

11. In an airplane wing, substantially parallel spars each comprising a web, with edges opposite respectively the upper and the under surfaces of the wing, a pressurized cabin to accommodate the passengers, said cabin being fixed to said spars along said edges, and sheet-like flanges for said spars arranged between the spars outside said pressurized cabin.

ROGER AIMÉ ROBERT.

REFERENCES CITED

The following references are of record in the file of this patent:

UNITED STATES PATENTS

| Number | Name | Date |
|---|---|---|
| 1,885,406 | Bechereau | Nov. 1, 1932 |
| 2,043,980 | Bellanca | June 16, 1936 |
| 2,236,482 | Zindel | Mar. 25, 1941 |
| 2,263,365 | Nicolaus et al. | Nov. 18, 1941 |
| 2,332,648 | Knight | Oct. 26, 1943 |